(12) United States Patent
Tanaka

(10) Patent No.: US 8,896,518 B2
(45) Date of Patent: Nov. 25, 2014

(54) DISPLAY MODULE, DISPLAY DEVICE, AND LIQUID CRYSTAL TELEVISION SET

(75) Inventor: Kazuya Tanaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 115 days.

(21) Appl. No.: 13/420,053

(22) Filed: Mar. 14, 2012

(65) Prior Publication Data

US 2012/0249406 A1 Oct. 4, 2012

(30) Foreign Application Priority Data

Mar. 28, 2011 (JP) .................................. 2011-69880

(51) Int. Cl.
*G09G 3/36* (2006.01)
*F21V 8/00* (2006.01)
*G02F 1/1335* (2006.01)

(52) U.S. Cl.
CPC ............ *G09G 3/36* (2013.01); *G02F 2201/503* (2013.01); *G02B 6/0088* (2013.01); *G02F 2201/46* (2013.01); *G02F 1/133615* (2013.01); *G02F 1/133608* (2013.01); *Y10S 345/905* (2013.01); *Y10S 248/917* (2013.01)
USPC ............... 345/102; 345/905; 345/87; 349/56; 248/917; 361/679.01

(58) Field of Classification Search
USPC ............ 248/917, 328, 127; 345/102, 905, 87; 349/56; 361/679.01–679.29; 206/736
See application file for complete search history.

(56) References Cited

U.S. PATENT DOCUMENTS

| | | | |
|---|---|---|---|
| 5,946,061 A * | 8/1999 | Kurihara et al. | 349/58 |
| 6,175,396 B1 * | 1/2001 | Kim et al. | 349/58 |
| 7,057,678 B2 * | 6/2006 | Ishida et al. | 349/58 |
| 7,081,880 B2 | 7/2006 | Morishita et al. | |
| 7,452,102 B2 * | 11/2008 | Ryu | 362/225 |
| 7,764,335 B2 | 7/2010 | Tanaka et al. | |
| 8,054,403 B2 * | 11/2011 | Kim et al. | 349/61 |
| 8,310,616 B2 * | 11/2012 | Yun et al. | 349/58 |
| 2003/0043312 A1 * | 3/2003 | Nishida et al. | 349/58 |
| 2010/0265638 A1 * | 10/2010 | Sakamoto et al. | 361/679.01 |

FOREIGN PATENT DOCUMENTS

| | | |
|---|---|---|
| JP | 2003-279934 A | 10/2003 |
| JP | 2007-57583 A | 3/2007 |
| JP | 2009-92721 A | 4/2009 |

* cited by examiner

*Primary Examiner* — Jason Olson
*Assistant Examiner* — Linh N Hoffner
(74) *Attorney, Agent, or Firm* — Crowell & Moring LLP

(57) ABSTRACT

This display module includes a display portion, a light-emitting portion to apply light to the display portion, a light guide plate made of resin to guide the light from the light-emitting portion to the display portion, including a first positioning portion, a frame made of metal in which the light guide plate is arranged inside, including a hole, and a positioning member made of resin, including a second positioning portion so formed as to be capable of positioning the first positioning portion of the light guide plate in a state where the positioning member is so arranged as to cover the hole of the frame.

18 Claims, 5 Drawing Sheets

DISPLAY MODULE, DISPLAY DEVICE, AND LIQUID CRYSTAL TELEVISION SET

BACKGROUND OF THE INVENTION

1. Field of the Invention

The present invention relates to a display module, a display device, and a liquid crystal television set, and more particularly, it relates to a display module, a display device, and a liquid crystal television set each including a light guide plate made of resin and a frame made of metal.

2. Description of the Background Art

A display module including a light guide plate made of resin and a frame made of metal is known in general, as disclosed in Japanese Patent Laying-Open No. 2003-279934, for example.

The aforementioned Japanese Patent Laying-Open No. 2003-279934 discloses an image display device including a displaying unit, a backlight unit having a light guide plate to apply light to the displaying unit, and a lower frame made of metal supporting the backlight unit. The light guide plate of the backlight unit in the image display device according to the aforementioned Japanese Patent Laying-Open No. 2003-279934 is formed with concave notches. A pair of bent portions extending upward are so formed on the lower frame as to correspond to the inner surfaces of the concave notches of the light guide plate, opposed to each other. In the image display device according to the aforementioned Japanese Patent Laying-Open No. 2003-279934, the backlight unit is so arranged on the lower frame that the concave notches of the light guide plate of the backlight unit correspond to the pair of bent portions of the lower frame, whereby the backlight unit is positioned with respect to the lower frame.

In the image display device according to the aforementioned Japanese Patent Laying-Open No. 2003-279934, however, the concave notches of the light guide plate and the bent portions of the lower frame made of metal may come into contact with each other during assembling, transportation, or the like of the image display device in a state where the backlight unit is arranged on the lower frame. In this case, the light guide plate is generally made of resin that is more fragile than metal, whereby defects such as weak or breakage are disadvantageously easily formed on contact portions of the concave notches (positioning portions) of the light guide plate with the bent portions.

SUMMARY OF THE INVENTION

The present invention has been proposed in order to solve the aforementioned problem, and an object of the present invention is to provide a display module, a display device, and a liquid crystal television set capable of inhibiting formation of a defect such as weak or breakage on a light guide plate due to contact of a positioning portion of the light guide plate made of resin with a frame made of metal.

A display module according to a first aspect of the present invention includes a display portion, a light-emitting portion to apply light to the display portion, a light guide plate made of resin to guide the light from the light-emitting portion to the display portion, including a first positioning portion, a frame made of metal in which the light guide plate is arranged inside, including a hole, and a positioning member made of resin, including a second positioning portion so formed as to be capable of positioning the first positioning portion of the light guide plate in a state where the positioning member is so arranged as to cover the hole of the frame.

As hereinabove described, the display module according to the first aspect of the present invention includes the light guide plate made of resin, including the first positioning portion and the positioning member made of resin, including the second positioning portion so formed as to be capable of positioning the first positioning portion of the light guide plate, whereby the light guide plate made of resin can be positioned by the positioning member made of resin. Thus, formation of a defect such as wear or breakage on the light guide plate can be inhibited dissimilarly to a case where the light guide plate made of resin is positioned by a positioning portion formed by partially uprightly folding the frame made of metal. Furthermore, the positioning member made of resin is so arranged as to cover the hole of the frame, whereby the positioning member can inhibit leakage of light inside the display module from the hole to the outside.

In the aforementioned display module according to the first aspect, the first positioning portion of the light guide plate preferably has a concave shape, and the second positioning portion of the positioning member preferably has a shape corresponding to the concave shape of the first positioning portion. According to this structure, the light guide plate is so arranged that the concave first positioning portion of the light guide plate corresponds to the second positioning portion of the positioning member, whereby the light guide plate can be easily positioned.

In this case, the first positioning portion having the concave shape preferably extends in a first direction and has first and second inner surfaces opposed to each other and a third inner surface extending in a second direction substantially orthogonal to the first direction, and the second positioning portion preferably extends in the first direction and has first and second side surfaces positioning the first and second inner surfaces, respectively and a third side surface extending in the second direction, positioning the third inner surface. According to this structure, the first and second side surfaces of the second positioning portion can regulate movement of the first positioning portion in the second direction while the third side surface of the second positioning portion can regulate movement of the first positioning portion in either one direction of two directions included in the first direction. Consequently, the light guide plate can be reliably positioned.

In the aforementioned display module according to the first aspect, the frame preferably further includes a folded section formed when the hole is formed by partially uprightly folding the frame, the positioning member preferably further includes a recess portion fitted onto the folded section, and a position of the second positioning portion of the positioning member is preferably defined in a state where the recess portion is fitted onto the folded section. According to this structure, the position of the second positioning portion of the positioning member can be easily defined by the folded section of the frame.

The aforementioned display module including the frame including the folded section preferably further includes a reflective sheet arranged between the light guide plate and the frame, and the positioning member is preferably arranged on a surface of the reflective sheet closer to the light guide plate at least in a periphery of the folded section. According to this structure, the reflective sheet is held between the frame and the positioning member, and hence positional deviation of the reflective sheet can be inhibited.

The aforementioned display module including the frame including the folded section preferably further includes a reflective sheet arranged between the light guide plate and the frame, including a third positioning portion so formed as to be capable of being positioned by the folded section. According to this structure, the reflective sheet can be easily positioned by the folded section of the frame.

The aforementioned display module including the frame including the folded section preferably further includes a reflective sheet arranged between the light guide plate and the frame, and the positioning member preferably further includes a portion arranged between the folded section and the reflective sheet to close a clearance between the folded section and the reflective sheet. According to this structure, the portion of the positioning member arranged between the folded section and the reflective sheet can inhibit leakage of light from the hole formed when the folded section is formed through the clearance between the folded section and the reflective sheet.

In the aforementioned display module including the positioning member including the portion to close the clearance, the portion of the positioning member preferably protrudes toward the frame and is preferably inserted into between the folded section and the reflective sheet to close the clearance between the folded section and the reflective sheet. According to this structure, the portion inserted into between the folded section and the reflective sheet can close the clearance between the folded section and the reflective sheet, and hence the leakage of light from the hole formed when the folded section is formed can be further inhibited.

In the aforementioned display module including the positioning member including the portion to close the clearance, the hole of the frame is preferably covered with the reflective sheet and the portion of the positioning member. According to this structure, leakage of light from the hole of the frame can be reliably inhibited.

In the aforementioned display module including the frame including the folded section, the folded section of the frame is preferably formed in a vicinity of a side surface of the frame. According to this structure, a wide region where the display portion, the light-emitting portion, and the light guide plate are arranged can be secured.

In the aforementioned display module including the folded section formed in the vicinity of the side surface, the folded section is preferably formed toward the side surface of the frame so that the folded section is formed on a side of the side surface of the frame relative to the hole. According to this structure, the folded section of the frame can be brought closer to the side surface, and hence a wider region where the display portion, the light-emitting portion, and the light guide plate are arranged can be secured.

In the aforementioned display module including the folded section formed in the vicinity of the side surface, the folded section is preferably formed toward a side opposite to the side surface of the frame so that the folded section is formed on the side opposite to the side surface of the frame relative to the hole. According to this structure, the folded section can be arranged between the light guide plate and the hole, and hence the folded section can inhibit light from the light guide plate from reaching the hole. Thus, leakage of light from the hole can be further inhibited.

The aforementioned display module according to the first aspect preferably further includes an optical sheet including a fourth positioning portion so formed as to be capable of being positioned by the second positioning portion of the positioning member, arranged on a surface of the light guide plate closer to the display portion. According to this structure, the optical sheet can be easily positioned by the second positioning portion of the positioning member.

In this case, a protrusion height of an end portion of the second positioning portion of the positioning member closer to the display portion is preferably at least a protrusion height of an end portion of the fourth positioning portion of the optical sheet closer to the display portion. According to this structure, the overall first positioning portion of the light guide plate and the overall fourth positioning portion of the optical sheet can be brought into contact with the second positioning portion of the positioning member. Thus, the light guide plate and the optical sheet can be reliably positioned on the second positioning portion of the positioning member.

In the aforementioned display module according to the first aspect, the positioning member is preferably made of a white resin member capable of reflecting light. According to this structure, the positioning member can also reflect light, and hence light emitted from the light-emitting portion can be effectively utilized.

A display device according to a second aspect of the present invention includes a display portion, a light-emitting portion to apply light to the display portion, a light guide plate made of resin to guide the light from the light-emitting portion to the display portion, including a first positioning portion, a frame made of metal in which the light guide plate is arranged inside, including a hole, and a positioning member made of resin, including a second positioning portion so formed as to be capable of positioning the first positioning portion of the light guide plate in a state where the positioning member is so arranged as to cover the hole of the frame.

As hereinabove described, the display device according to the second aspect of the present invention includes the light guide plate made of resin, including the first positioning portion and the positioning member made of resin, including the second positioning portion so formed as to be capable of positioning the first positioning portion of the light guide plate, whereby the light guide plate made of resin can be positioned by the positioning member made of resin. Thus, formation of a defect such as wear or breakage on the light guide plate can be inhibited dissimilarly to a case where the light guide plate made of resin is positioned by a positioning portion formed by partially uprightly folding the frame made of metal. Furthermore, the positioning member made of resin is so arranged as to cover the hole of the frame, whereby the positioning member can inhibit leakage of light inside the display device from the hole to the outside.

In the aforementioned display device according to the second aspect, the first positioning portion of the light guide plate preferably has a concave shape, and the second positioning portion of the positioning member preferably has a shape corresponding to the concave shape of the first positioning portion. According to this structure, the light guide plate is so arranged that the concave first positioning portion of the light guide plate corresponds to the second positioning portion of the positioning member, whereby the light guide plate can be easily positioned.

In the aforementioned display device according to the second aspect, the frame preferably further includes a folded section formed when the hole is formed by partially uprightly folding the frame, the positioning member preferably further includes a recess portion fitted onto the folded section, and a position of the second positioning portion of the positioning member is preferably defined in a state where the recess portion is fitted onto the folded section. According to this structure, the position of the second positioning portion of the positioning member can be easily defined by the folded section of the frame.

The aforementioned display device including the frame including the folded section preferably further includes a reflective sheet arranged between the light guide plate and the frame, and the positioning member is preferably arranged on a surface of the reflective sheet closer to the light guide plate at least in a periphery of the folded section. According to this structure, the reflective sheet is held between the frame and the positioning member, and hence positional deviation of the reflective sheet can be inhibited.

A liquid crystal television set according to a third aspect of the present invention includes a liquid crystal display portion, a light-emitting portion to apply light to the liquid crystal display portion, a light guide plate made of resin to guide the light from the light-emitting portion to the liquid crystal display portion, including a first positioning portion, a frame made of metal in which the light guide plate is arranged inside, including a hole, and a positioning member made of resin, including a second positioning portion so formed as to be capable of positioning the first positioning portion of the light guide plate in a state where the positioning member is so arranged as to cover the hole of the frame.

As hereinabove described, the liquid crystal television set according to the third aspect of the present invention includes the light guide plate made of resin, including the first positioning portion and the positioning member made of resin, including the second positioning portion so formed as to be capable of positioning the first positioning portion of the light guide plate, whereby the light guide plate made of resin can be positioned by the positioning member made of resin. Thus, formation of a defect such as wear or breakage on the light guide plate can be inhibited dissimilarly to a case where the light guide plate made of resin is positioned by a positioning portion formed by partially uprightly folding the frame made of metal. Furthermore, the positioning member made of resin is so arranged as to cover the hole of the frame, whereby the positioning member can inhibit leakage of light inside the liquid crystal television set from the hole to the outside.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

First, the structure of a liquid crystal television set 100 according to a first embodiment of the present invention is described with reference to FIGS. 1 to 7. The liquid crystal television set 100 is an example of the "display device" in the present invention.

Figure 1:
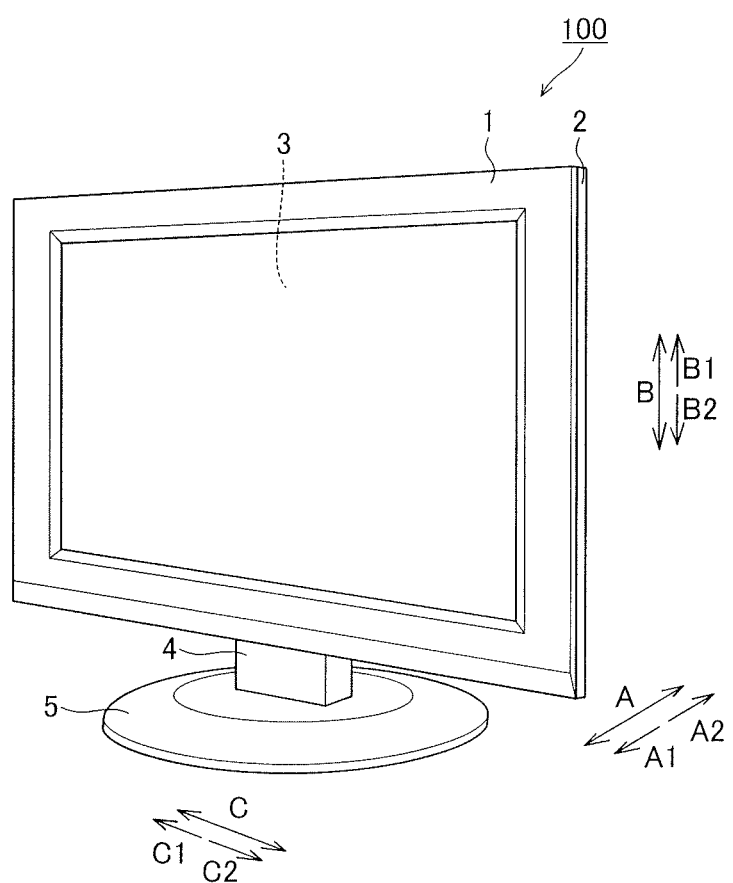
FIG. 1 is a perspective view showing the overall structure of a liquid crystal display device according to a first embodiment of the present invention.

The liquid crystal television set 100 according to the first embodiment of the present invention includes a front housing 1 arranged on the front side (A1 side), a rear housing 2 arranged on the rear side (A2 side), a liquid crystal module 3 arranged between the front housing 1 and the rear housing 2, a support member 4 supporting the overall liquid crystal television set 100, and a base member 5 supporting the support member 4, as shown in FIG. 1. The liquid crystal module 3 is an example of the "display module" in the present invention.

Figure 2:
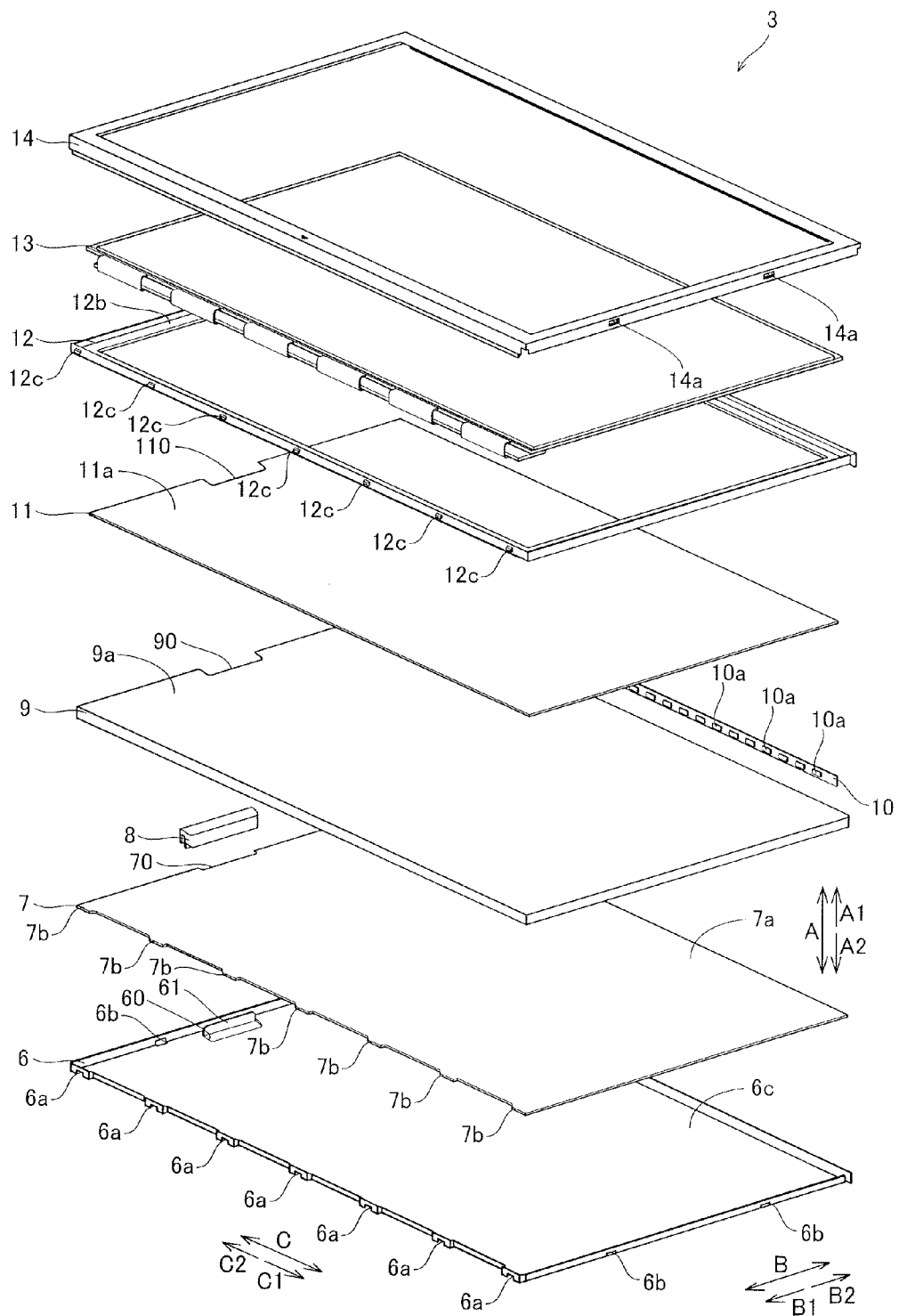
FIG. 2 is an exploded perspective view showing the structure of a liquid crystal module according to the first embodiment of the present invention.

As shown in FIG. 2, the liquid crystal module 3 includes a rear frame 6, a reflective sheet 7, a positioning member 8, a light guide plate 9, a light source 10, and an optical sheet 11 successively from the A2 side. The liquid crystal module 3 further includes a frame-shaped resin frame 12, a liquid crystal panel 13 (liquid crystal cell), and a frame-shaped bezel 14 successively from the A2 side. The rear frame 6 is an example of the "frame" in the present invention, and the light source 10 is an example of the "light-emitting portion" in the present invention. The liquid crystal panel 13 is an example of the "display portion" and the "liquid crystal display portion" in the present invention.

The rear frame 6 is made of metal (sheet metal) and provided in the form of a box having four sides. The rear frame 6 is formed to be capable of storing the reflective sheet 7, the positioning member 8, the light guide plate 9, the light source 10, and the optical sheet 11 inside. Seven engaging portions 6a are formed on the side surface of the rear frame 6 on a B1 side. Two engaging holes 6b are formed on the side surface of the rear frame 6 on a C1 side. Furthermore, two engaging holes 6b are formed on the side surface of the rear frame 6 on a C2 side, similarly to the side surface on the C1 side.

Figure 3:
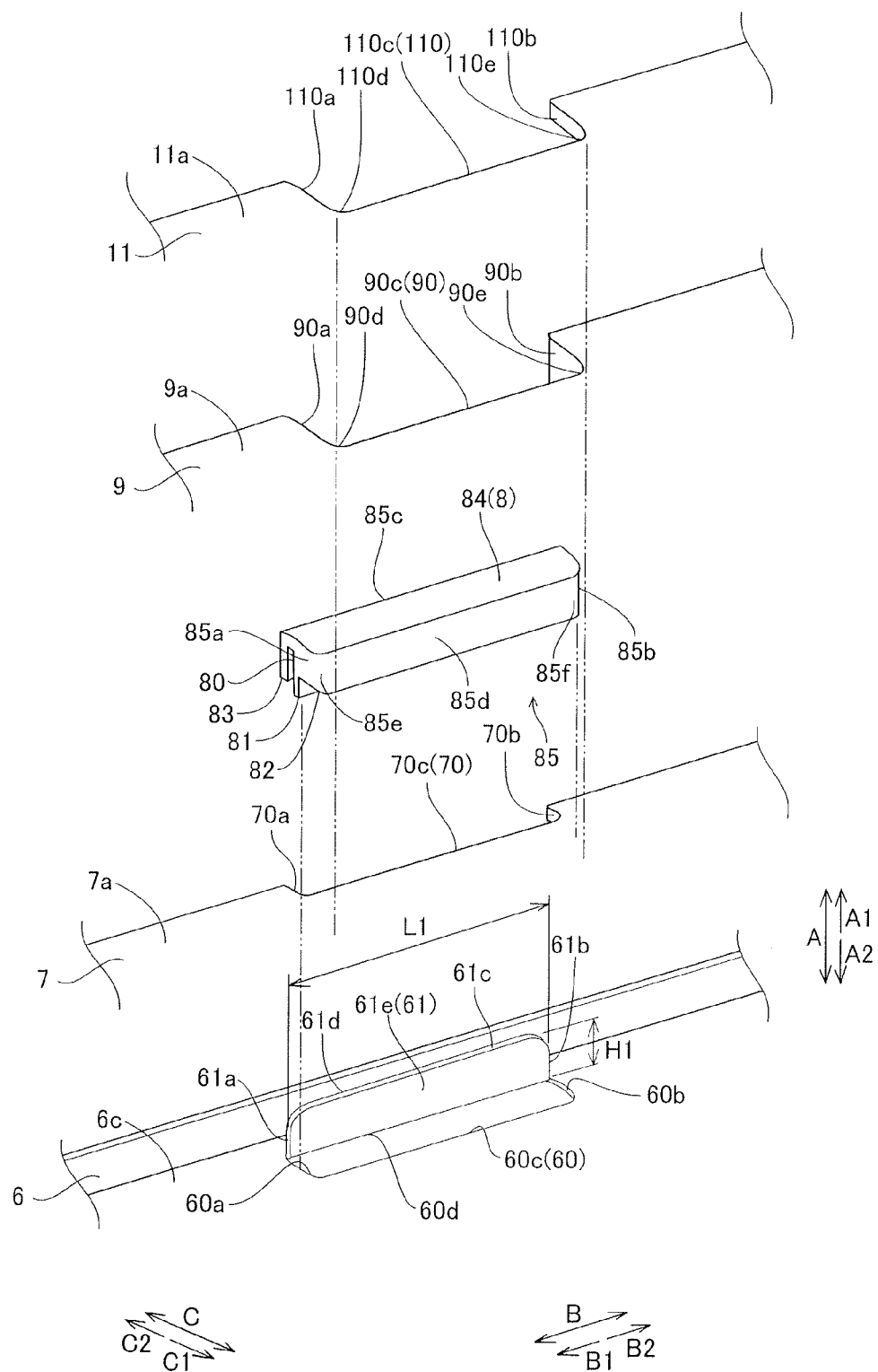
FIG. 3 is an enlarged, exploded perspective view showing a part on a C2 side, of the liquid crystal module according to the first embodiment of the present invention.

According to the first embodiment, a notched hole 60 and a folded section 61 are formed in the bottom portion 6c of the rear frame 6 in the vicinity of the side surface on the C2 side, as shown in FIG. 3. This folded section 61 is formed by uprightly folding a part of the bottom portion 6c from the C1 side toward the C2 side on the A1 side. The notched hole 60 is formed of a part of the bottom portion 6c corresponding to the folded section 61. In other words, the folded section 61 is formed on the C2 side of the notched hole 60. The notched hole 60 is an example of the "hole" in the present invention.

The notched section 60 is constituted by inner surfaces 60a and 60b linearly extending in a direction C on B1 and B2 sides, an inner surface 60c linearly extending in a direction B on the C1 side, and an inner surface 60d formed in the boundary with the notched section 61 on the C2 side. The inner surfaces 60a and 60c are arcuately connected to each other on the B1 side while the inner surfaces 60b and 60c are arcuately connected to each other on the B2 side.

The folded section 61 formed of the part of the bottom portion 6c corresponding to the notched hole 60 has a shape corresponding to the hole shape of the notched hole 60. Specifically, the folded section 61 is in the form of a flat plate so extending as to be raised in a direction A. Side surfaces 61*a* and 61*b* corresponding to the inner surfaces 60*a* and 60*b* of the notched hole 60 are so formed on the B1 and B2 sides of the folded section 61 as to extend in the direction A. An upper surface 61*c* corresponding to the inner surface 60*c* of the notched hole 60 is so formed on the A1 side of the folded section 61 as to extend in the direction B. The side surface 61*a* and the upper surface 61*c* are connected by a curved (arcuate) chamfer on the B1 side while the side surface 61*b* and the upper surface 61*c* are connected by a curved (arcuate) chamfer on the B2 side. The side surface 61*d* of the folded section 61 on the C2 side, corresponding to the surface of the bottom portion 6*c* on the A1 side and the side surface 61*e* of the folded section 61 on the C1 side, corresponding to the surface of the bottom portion 6*c* on the A2 side are planarized.

The folded section 61 has a height H1 in the direction A, a length L1 in the direction B, and a thickness t1 (see FIG. 4) in the direction C.

The reflective sheet 7 is in the form of a plate and arranged on the surface of the bottom portion 6*c* of the rear frame 6 on the A1 side, as shown in FIG. 2. This reflective sheet 7 has a function of reflecting light travelling to the A2 side toward the A1 side.

A concave positioning portion 70 having an opening on the C2 side is formed in the vicinity of the side surface of the reflective sheet 7 on the C2 side. This positioning portion 70 is formed with planarized inner surfaces 70*a* and 70*b* on the B1 and B2 sides and a planarized inner surface 70*c* on the C1 side, as shown in FIG. 3. The inner surface 70*a* on the B1 side and the inner surface 70*c* on the C1 side are arcuately connected to each other while the inner surface 70*b* on the B2 side and the inner surface 70*c* on the C1 side are arcuately connected to each other. The positioning portion 70 is an example of the "third positioning portion" in the present invention.

Figure 4:
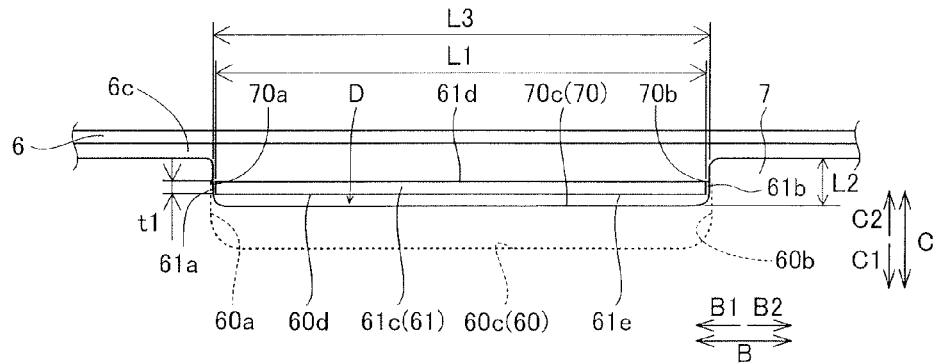
FIG. 4 is a plan view showing the periphery of a folded section of the liquid crystal module according to the first embodiment of the present invention.

As shown in FIG. 4, the positioning portion 70 is so formed that a length L2 from the inner surface 70*c* on the C1 side to the opening on the C2 side is larger than the thickness t1 of the folded section 61 while an interval L3 between the inner surfaces 70*a* and 70*b* is larger than the length L1 of the folded section 61. Thus, the concave positioning portion 70 is arranged on the folded section 61 of the rear frame 6 from the C2 side of the positioning portion 70, whereby the inner surfaces 70*a* and 70*b* of the positioning portion 70 are positioned by the side surfaces 61*a* and 61*b* of the folded section 61, respectively while the inner surface 70*c* of the positioning portion 70 is positioned by the side surface 61*e* of the folded section 61. Consequently, the reflective sheet 7 is positioned with respect to the rear frame 6.

The reflective sheet 7 is so formed as to cover a part of the notched hole 60 on the C1 side from the A1 side (see FIG. 3) in a state where the same is positioned with respect to the rear frame 6. At this time, a clearance D is formed between the reflective sheet 7 and the folded section 61.

As shown in FIG. 2, the side surface of the reflective sheet 7 on the B1 side is formed with seven protrusion portions 7*b* at positions corresponding to the seven engaging portions 6*a* of the rear frame 6. Thus, the reflective sheet 7 can reflect light also at the seven engaging portions 6*a* of the rear frame 6 toward the A1 side.

Figure 5:
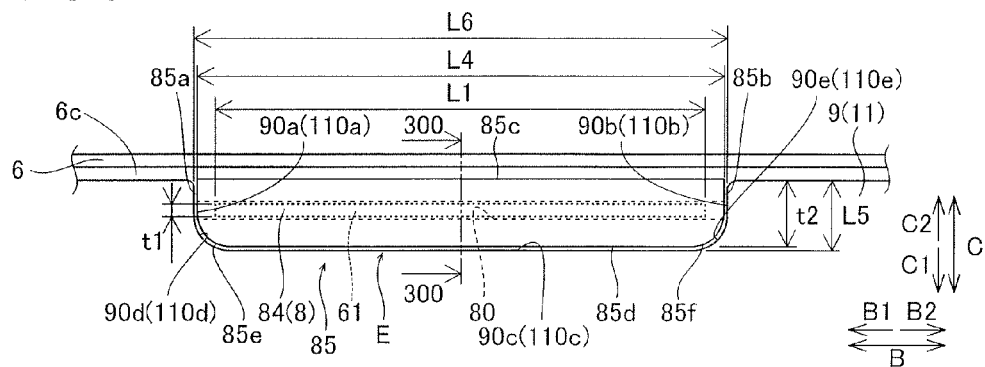
FIG. 5 is a plan view showing the periphery of a positioning member of the liquid crystal module according to the first embodiment of the present invention.

The positioning member 8 has a substantially rectangular parallelepiped shape, as shown in FIG. 3, and is made of a white resin member capable of reflecting light. The positioning member 8 has a length L4 in the direction B and a width (thickness) t2 in the direction C, as shown in FIG. 5.

According to the first embodiment, the positioning member 8 is so arranged as to cover the folded section 61 in a state where the reflective sheet 7 is arranged on the bottom portion 6*c* of the rear frame 6. Specifically, the bottom surface (surface on the A2 side) of the positioning member 8 is formed with a concave groove portion 80 having an opening on the A2 side, as shown in FIG. 3. This groove portion 80 is so formed on the C2 side of the positioning member 8 as to uniformly extend in the direction B from the side surface of the positioning member 8 on the B1 side to the side surface of the positioning member 8 on the B2 side, as shown in FIG. 5. The groove portion 80 is an example of the "recess portion" in the present invention.

As shown in FIG. 3, the depth in the direction A, of the side surface of the groove portion 80 on the C1 side is larger than the depth in the direction A, of the side surface of the groove portion 80 on the C2 side. Furthermore, the depth in the direction A, of the side surface of the groove portion 80 on the C1 side is larger than the height H1 of the folded section 61 while the length L4 of the positioning member 8 in the direction B is larger than the length L1 of the folded section 61. Consequently, the groove portion 80 of the positioning member 8 is so formed as to be fitted onto the folded section 61 and cover the overall folded section 60 from the A1 side (see FIG. 3) in a state fitted onto the folded section 61, as shown in FIG. 5.

As shown in FIG. 3, the bottom surface (surface on the A2 side) of the positioning member 8 is formed with a protrusion portion 81 protruding downward, formed on the C1 side of the groove portion 80, a bottom surface portion 82 extending to the C1 side, formed on the A1 side relative to the protrusion portion 81, and a bottom surface portion 83 formed on the C2 side of the groove portion 80. The protrusion portion 81 is an example of the "portion" in the present invention.

Figure 6:
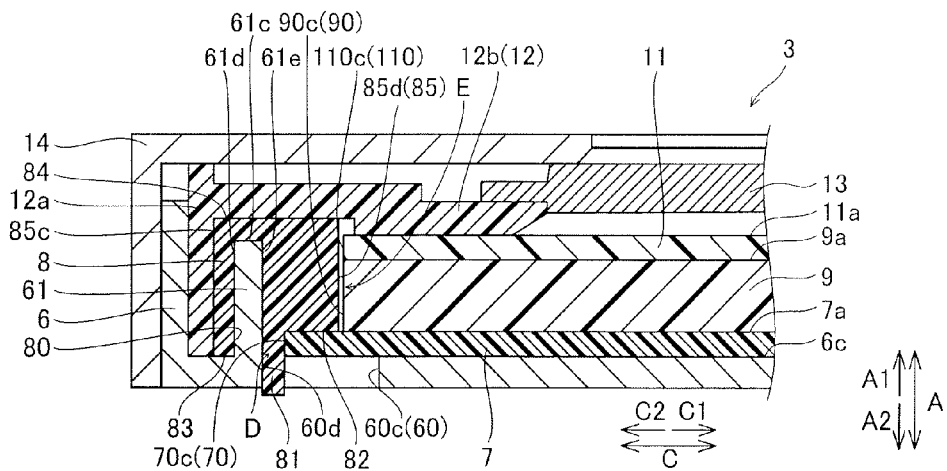
FIG. 6 is a sectional view of the liquid crystal module taken along the line 300-300 in FIG. 5.

The protrusion portion 81 is inserted into between the reflective sheet 7 and the folded section 61 to close the clearance D between the reflective sheet 7 and the folded section 61 in a state where the groove portion 80 of the positioning member 8 is fitted onto the folded section 61 of the rear frame 6, as shown in FIG. 6. In other words, the protrusion portion 81 of the positioning member 8 is so formed as to cover a part of the notched hole 60 on the C2 side from the A1 side in the periphery of the folded section 61 of the rear frame 6. The overall notched hole 60 of the rear frame 6 is covered with the reflective sheet 7 and the protrusion portion 81 of the positioning member 8. At this time, the lower end of the protrusion portion 81 on the A2 side is located on the A2 side relative to the surface of the bottom portion 6*c* of the rear frame 6 on the A2 side.

The bottom surface portion 82 on the C1 side of the positioning member 8 is so formed as to come into contact with the upper surface 7*a* of the reflective sheet 7 on the A1 side in the periphery of the positioning member 8 in the state where the groove portion 80 of the positioning member 8 is fitted onto the folded section 61. The bottom surface portion 83 on the C2 side is so formed as to come into contact with the surface of the bottom portion 6*c* of the rear frame 6 on the A1 side, located on the C2 side of the folded section 61. The lower surface of the resin frame 12 is arranged on the planarized upper surface (surface on the A1 side) 84 of the positioning member 8.

According to the first embodiment, side surfaces 85*a* and 85*b* on the A1 side of the positioning member 8 as well as on the B1 and B2 sides of the positioning member 8 are so planarized as to extend in the direction C, as shown in FIG. 5. Furthermore, side surfaces 85*c* and 85*d* on the C2 and C1 sides of the positioning member 8 are so planarized as to extend in the direction B. A curved (arcuate) chamfer 85*e* is formed between the side surface 85*a* on the B1 side and the side surface 85*d* on the C1 side while a curved (arcuate)

chamfer 85f is formed between the side surface 85b on the B2 side and the side surface 85d on the C1 side. Thus, a positioning portion 85 having a shape corresponding to the concave shapes of a positioning portion 90 of the light guide plate 9 and a positioning portion 110 of the optical sheet 11 described later is constituted by the side surfaces 85a, 85b, and 85d and the chamfers 85e and 85f. The positioning portion 85 is arranged in a position to position the positioning portion 90 of the light guide plate 9 and the positioning portion 110 of the optical sheet 11 in the state where the groove portion 80 of the positioning member 8 is fitted onto the folded section 61 of the rear frame 6. The positioning portion 85 is an example of the "second positioning portion" in the present invention, and the side surfaces 85a, 85b, and 85d are examples of the "first side surface", the "second side surface", and the "third side surface" in the present invention, respectively. The directions C and B are examples of the "first direction" and the "second direction" in the present invention, respectively.

The light guide plate 9 is made of PC (polycarbonate) resin in the form of a flat plate and arranged on the upper surface 7a of the reflective sheet 7 on the A1 side, as shown in FIG. 2. The light source 10 having a plurality of LEDs 10a arranged along the direction C at constant intervals is arranged in a position corresponding to the side surface of the light guide plate 9 on the B2 side. This light guide plate 9 has a function of guiding light emitted to the B1 side from the plurality of LEDs 10a to the A1 side.

According to the first embodiment, the concave positioning portion 90 having an opening on the C2 side is formed in the vicinity of the side surface of the light guide plate 9 on the C2 side, as shown in FIG. 5. This positioning portion 90 is formed with planarized inner surfaces 90a and 90b extending in the direction C on the B1 and B2 sides and a planarized inner surface 90c extending in the direction B on the C1 side. An arcuate connection portion 90d is formed between the inner surface 90a on the B1 side and the inner surface 90c on the C1 side while an arcuate connection portion 90e is formed between the inner surface 90b on the B2 side and the inner surface 90c on the C1 side. The positioning portion 90 is so formed that a length L5 from the inner surface 90c on the C1 side to the opening on the C2 side is larger than the width (thickness) t2 of the positioning member 8 while an interval L6 between the inner surfaces 90a and 90b is larger than the length L4 of the positioning member 8. The positioning portion 90 is an example of the "first positioning portion" in the present invention.

Thus, the concave positioning portion 90 is arranged on the positioning member 8 from the C2 side of the positioning portion 90, whereby the planarized inner surfaces 90a and 90b of the positioning portion 90 are positioned by the planarized side surfaces 85a and 85b of the positioning member 8, respectively while the planarized inner surface 90c of the positioning portion 90 is positioned by the planarized side surface 85d of the positioning member 8. The connection portions 90d and 90e of the positioning portion 90 are positioned by the chamfers 85e and 85f of the positioning member 8, respectively. Consequently, the concave positioning portion 90 of the light guide plate 9 made of resin is positioned with respect to the positioning portion 85 of the positioning member 8 made of resin. The inner surfaces 90a, 90b, and 90c are examples of the "first inner surface", the "second inner surface", and the "third inner surface" in the present invention, respectively.

The optical sheet 11 is made of resin in the form of a flat plate and arranged on the upper surface 9a of the light guide plate 9 on the A1 side, as shown in FIG. 2. This optical sheet 11 is made of a diffusion sheet diffusing light or a prism sheet guiding light to the A1 side.

As shown in FIG. 5, the concave positioning portion 110 having a shape similar to that of the positioning portion 90 of the light guide plate 9 in plan view (as viewed from the A1 side (see FIG. 3)) is formed in the vicinity of the side surface of the optical sheet 11 on the C2 side. Specifically, the positioning portion 110 is formed with planarized inner surfaces 110a and 110b on the B1 and B2 sides and a planarized inner surface 110c on the C1 side. An arcuate connection portion 110d is formed between the inner surface 110a on the B1 side and the inner surface 110c on the C1 side while an arcuate connection portion 110e is formed between the inner surface 110b on the B2 side and the inner surface 110c on the C1 side. The positioning portion 110 is so formed that a length L5 from the inner surface 110c on the C1 side to the opening on the C2 side is larger than the width (thickness) t2 of the positioning member 8 while an interval L6 between the inner surfaces 110a and 110b is larger than the length L4 of the positioning member 8. The positioning portion 110 is an example of the "fourth positioning portion" in the present invention.

Thus, the concave positioning portion 110 is arranged on the positioning member 8 from the C2 side of the positioning portion 110, whereby the planarized inner surfaces 110a and 110b of the positioning portion 110 are positioned by the planarized side surfaces 85a and 85b of the positioning member 8, respectively while the planarized inner surface 110c of the positioning portion 110 is positioned by the planarized side surface 85d of the positioning member 8. The connection portions 110d and 110e of the positioning portion 110 are positioned by the chamfers 85e and 85f of the positioning member 8, respectively. Consequently, the optical sheet 11 made of resin is positioned with respect to the positioning portion 85 of the positioning member 8 made of resin.

Figure 7:
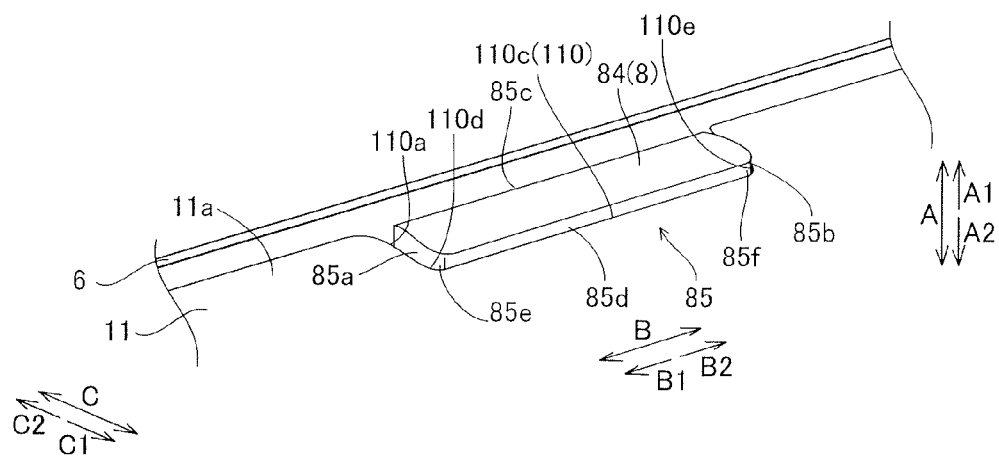
FIG. 7 is a perspective view showing the positioning member and an optical sheet of the liquid crystal module according to the first embodiment of the present invention.

As shown in FIGS. 6 and 7, the position of the upper surface 84 of the positioning member 8 in the direction A is located on the A1 side relative to the position of the upper surface (surface on the A1 side) 11a of the optical sheet 11 in the direction A, whereby the protrusion height of the upper surface 84 of the positioning member 8 is higher than the protrusion height of the upper surface 11a of the optical sheet 11.

As shown in FIG. 6, a clearance E is formed between the positioning portion 90 of the light guide plate 9 as well as the positioning portion 110 of the optical sheet 11 and the positioning portion 85 of the positioning member 8. The clearance E is surrounded by the reflective sheet 7, the positioning member 8, and the resin frame 12 so that leakage of light from the clearance E to the outside can be inhibited.

The resin frame 12 has a wall portion 12a arranged between the side surface of the rear frame 6 on the C1 side and the side surface 85c of the positioning member 8 and a support portion 12b extending from the A1 side of the wall portion 12a to the C1 side, as shown in FIG. 6. This support portion 12b supports the liquid crystal panel 13 from the A2 side. As shown in FIG. 2, seven engaging protrusion portions 12c fitted into the seven engaging portions 6a of the rear frame 6 are formed on the side surface of the resin frame 12 on the B1 side.

The liquid crystal panel 13 has a function of displaying an image on the A1 side on the basis of light emitted from the light source 10. Engaging portions 14a corresponding to the two engaging holes 6b of the rear frame 6 are formed on the side surface of the frame-shaped bezel 14 on the C1 side. Furthermore, unshown engaging portions corresponding to the engaging holes 6b of the rear frame 6 are formed on the side surface of the frame-shaped bezel 14 on the C2 side, similarly to the side surface on the C1 side. The engaging portions 14a and the unshown engaging portions engage with the four engaging holes 6b of the rear frame 6, whereby the bezel 14 is fixed onto the rear frame 6.

According to the first embodiment, as hereinabove described, the concave positioning portion 90 of the light guide plate 9 made of resin is positioned with respect to the positioning portion 85 of the positioning member 8 made of resin, whereby the light guide plate 9 made of resin can be positioned by the positioning member 8 made of resin. Thus, formation of a defect such as wear or breakage on the light guide plate 9 can be inhibited dissimilarly to a case where the light guide plate 9 made of resin is positioned by the folded section 61 formed by partially uprightly folding the rear frame 6 made of metal. Furthermore, the light guide plate 9 is so arranged that the concave positioning portion 90 of the light guide plate 9 corresponds to the positioning portion 85 of the positioning member 8, whereby the light guide plate 9 can be easily positioned.

According to the first embodiment, as hereinabove described, the protrusion portion 81 of the positioning member 8 is arranged between the reflective sheet 7 and the folded section 61 to close the clearance D between the reflective sheet 7 and the folded section 61 in the state where the groove portion 80 is fitted onto the folded section 61 of the rear frame 6, whereby the positioning member 8 can inhibit leakage of light inside the liquid crystal module 3 from the notched hole 60 to the outside. Furthermore, the protrusion portion 81 of the positioning member 8 can inhibit leakage of light from the notched hole 60 formed when the folded section 61 is formed through the clearance D between the folded section 61 and the reflective sheet 7.

According to the first embodiment, as hereinabove described, the side surfaces 85a and 85b of the positioning portion 85 of the positioning member 8 are so planarized as to extend in the direction C, the side surface 85d of the positioning portion 85 is so planarized as to extend in the direction B, the inner surfaces 90a and 90b of the positioning portion 90 of the light guide plate 9 are so planarized as to extend in the direction C, and the inner surface 90c of the positioning portion 90 is so planarized as to extend in the direction B. Furthermore, the inner surfaces 90a and 90b of the positioning portion 90 are positioned by the side surfaces 85a and 85b of the positioning portion 85, respectively while the inner surface 90c of the positioning portion 90 is positioned by the side surface 85d of the positioning portion 85. Thus, the side surfaces 85a and 85b of the positioning portion 85 can regulate movement of the positioning portion 90 in the direction B while the side surface 85d of the positioning portion 85 can regulate movement of the positioning portion 90 in either one direction (direction C2) of two directions included in the direction C. Consequently, the light guide plate 9 can be reliably positioned.

According to the first embodiment, as hereinabove described, the folded section 61 formed by uprightly folding the part of the bottom portion 6c corresponding to the notched hole 60 from the C1 side toward the C2 side on the A1 side is formed in the rear frame 6, the groove portion 80 fitted onto the folded section 61 is formed in the positioning member 8, and the positioning portion 85 is arranged in the position to position the positioning portion 90 of the light guide plate 9 and the positioning portion 110 of the optical sheet 11 in the state where the groove portion 80 of the positioning member 8 is fitted onto the folded section 61 of the rear frame 6. According to this structure, the position of the positioning portion 85 of the positioning member 8 can be easily defined by the folded section 61 of the rear frame 6. Furthermore, the position of the positioning portion 85 of the positioning member 8 is defined by the folded section 61 of the rear frame 6, whereby the position of the light guide plate 9 positioned by the positioning portion 85 and the position of the rear frame 6 can be easily associated with each other.

According to the first embodiment, as hereinabove described, the bottom surface portion 82 on the C1 side of the positioning member 8 is so formed as to come into contact with the upper surface 7a of the reflective sheet 7 on the A1 side in the periphery of the positioning member 8 in the state where the groove portion 80 of the positioning member 8 is fitted onto the folded section 61. According to this structure, the reflective sheet 7 is held between the rear frame 6 and the positioning member 8, and hence positional deviation of the reflective sheet 7 can be inhibited.

According to the first embodiment, as hereinabove described, the inner surfaces 70a and 70b of the positioning portion 70 of the reflective sheet 7 are positioned by the side surfaces 61a and 61b of the folded section 61, respectively while the inner surface 70c of the positioning portion 70 is positioned by the side surface 61e of the folded section 61. Thus, the reflective sheet 7 can be easily positioned by the folded section 61 of the rear frame 6.

According to the first embodiment, as hereinabove described, the protrusion portion 81 is inserted into between the reflective sheet 7 and the folded section 61 to close the clearance D between the reflective sheet 7 and the folded section 61. Thus, the clearance D between the reflective sheet 7 and the folded section 61 can be closed by the protrusion portion 81, and hence the leakage of light from the notched hole 60 formed when the folded section 61 is formed can be further inhibited.

According to the first embodiment, as hereinabove described, the overall notched hole 60 of the rear frame 6 is covered with the reflective sheet 7 and the protrusion portion 81 of the positioning member 8, whereby leakage of light from the notched hole 60 of the rear frame 6 can be reliably inhibited.

According to the first embodiment, as hereinabove described, the notched hole 60 and the folded section 61 are formed in the vicinity of the side surface of the bottom portion 6c of the rear frame 6 on the C2 side, and the folded section 61 is formed by folding the part of the bottom portion 6c from the C1 side toward the C2 side on the A1 side so that the same is formed on the C2 side of the notched hole 60. Thus, the folded section 61 of the rear frame 6 can be brought closer to the side surface, and hence a wider region where the liquid crystal panel 13, the light source 10, and the light guide plate 9 are arranged can be secured.

According to the first embodiment, as hereinabove described, the planarized inner surfaces 110a and 110b of the positioning portion 110 of the optical sheet 11 are positioned by the planarized side surfaces 85a and 85b of the positioning member 8, respectively while the planarized inner surface 110c of the positioning portion 110 is positioned by the planarized side surface 85d of the positioning member 8. Thus, the optical sheet 11 can be easily positioned by the positioning portion 85 of the positioning member 8.

According to the first embodiment, as hereinabove described, the protrusion height of the upper surface 84 of the positioning member 8 is higher than the protrusion height of the upper surface 11a of the optical sheet 11. According to this structure, the overall positioning portion 90 of the light guide plate 9 and the overall positioning portion 110 of the optical sheet 11 can be brought into contact with the positioning portion 85 of the positioning member 8. Thus, the light guide plate 9 and the optical sheet 11 can be reliably positioned on the positioning portion 85 of the positioning member 8.

According to the first embodiment, as hereinabove described, the positioning member 8 is made of the white resin member capable of reflecting light. According to this structure, the positioning member 8 can also reflect light, and hence light emitted from the light source 10 can be effectively utilized.

Second Embodiment

Figure 8:
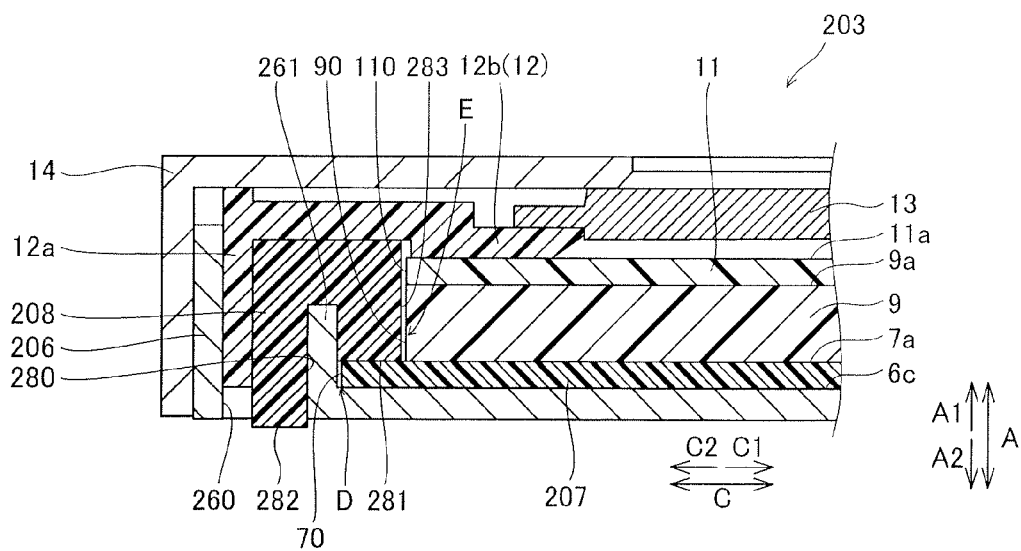
FIG. 8 is a sectional view showing a liquid crystal module of a liquid crystal display device according to a second embodiment of the present invention.

Next, a second embodiment of the present invention is described with reference to FIG. 8. In this second embodiment, a folded section 261 is formed on a C1 side of the notched hole 260 dissimilarly to the aforementioned first embodiment. The notched hole 260 is an example of the "hole" in the present invention.

In a liquid crystal module 203 according to the second embodiment of the present invention, the notched hole 260 and the folded section 261 are formed in the vicinity of the side surface of a bottom portion 6c of a rear frame 206 on a C2 side. This folded section 261 is provided in the form of a flat plate so extending as to be raised in a direction A by uprightly folding a part of the bottom portion 6c from the C2 side toward the C1 side on an A1 side. The notched hole 260 is formed of a part of the bottom portion 6c corresponding to the folded section 261. In other words, the folded section 261 is formed on the C1 side of the notched hole 260.

Furthermore, a reflective sheet 207 arranged on the C1 side of the folded section 261 is so formed as not to cover the notched hole 260 in a state where the reflective sheet 207 is positioned with respect to the rear frame 206, dissimilarly to the aforementioned first embodiment. At this time, a clearance D is formed between the reflective sheet 207 and the folded section 261.

A groove portion 280 fitted onto the folded section 261, a bottom surface portion 281 formed on the C1 side of the groove portion 280, and a bottom surface portion 282 formed on the C2 side of the groove portion 280 are formed in the bottom surface (surface on an A2 side) of a positioning member 208. The depth in the direction A, of the side surface of the groove portion 280 on the C2 side is larger than the depth in the direction A, of the side surface of the groove portion 280 on the C1 side. The groove portion 280 is an example of the "recess portion" in the present invention.

According to the second embodiment, the bottom surface portion 281 on the C1 side of the positioning member 208 is so formed as to come into contact with the upper surface 7a of the reflective sheet 207 on the A1 side in the periphery of the folded section 261 in a state where the groove portion 280 is fitted onto the folded section 261. At this time, the bottom surface portion 281 on the C1 side is also located on the A1 side of the clearance D between the folded section 261 and the reflective sheet 207. Thus, the positioning member 208 can inhibit leakage of light from the clearance D between the folded section 261 and the reflective sheet 207 to the outside.

The lower portion on the A2 side, of the bottom surface portion 282 of the positioning member 208 on the C2 side is arranged in the notched hole 260 while the lower end of the bottom surface portion 282 on the A2 side is located on the A2 side relative to the surface of the bottom portion 6c of the rear frame 206 on the A2 side. In other words, the bottom surface portion 282 of the positioning member 208 is so formed as to cover a part of the notched hole 260 on the C1 side from the A1 side in the periphery of the folded section 261 of the rear frame 206.

A positioning portion 283 formed of a side surface of the positioning member 208 is so formed as to be capable of positioning a positioning portion 90 of a light guide plate 9 and a positioning portion 110 of an optical sheet 11 in the state where the groove portion 280 of the positioning member 208 is fitted onto the folded section 261, similarly to the aforementioned first embodiment. The positioning portion 283 is an example of the "second positioning portion" in the present invention. The remaining structure of the second embodiment of the present invention is similar to that of the aforementioned first embodiment.

According to the second embodiment, as hereinabove described, the positioning portion 283 formed of the side surface of the positioning member 208 made of resin is so formed as to be capable of positioning the concave positioning portion 90 of the light guide plate 9 made of resin. Thus, the light guide plate 9 made of resin can be positioned by the positioning member 208 made of resin, and hence formation of a defect such as wear or breakage on the light guide plate 9 can be inhibited. Furthermore, the bottom surface portion 282 of the positioning member 208 is so formed as to cover the part of the notched hole 260 on the C2 side from the A1 side in the periphery of the folded section 261 of the rear frame 206, whereby the positioning member 208 made of resin can inhibit leakage of light inside the liquid crystal module 203 from the notched hole 260 to the outside.

According to the second embodiment, as hereinabove described, the folded section 261 is formed by folding the part of the bottom portion 6c from the C2 side toward the C1 side on the A1 side so that the same is formed on the C1 side of the notched hole 260. Thus, the folded section 261 so extending as to be raised in the direction A can be arranged between the light guide plate 9 and the notched hole 260, and hence the folded section 261 can inhibit light from the light guide plate 9 from reaching the notched hole 260. Thus, leakage of light from the notched hole 260 can be further inhibited. The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the liquid crystal television set is so formed that the positioning portion 90 of the light guide plate 9 and the positioning portion 110 of the optical sheet 11 can be positioned by the positioning portion 85 or 283 of the positioning member 8 or 208 in the state where the groove portion 80 or 280 of the positioning member 8 or 208 is fitted onto the folded section 61 or 261 of the rear frame 6 or 206 in each of the aforementioned first and second embodiments, the present invention is not restricted to this. In the present invention, the groove portion of the positioning member may not be fitted onto the folded section of the rear frame so far as the positioning portion of the positioning member can position the positioning portion of the light guide plate and the positioning portion of the optical sheet. For example, the liquid crystal television set may alternatively be so formed that the positioning portion of the light guide plate and the positioning portion of the optical sheet can be positioned by the positioning portion of the positioning member in a state where the positioning member comes into contact with a side surface of a hole for positioning.

While each of the positioning portion 90 of the light guide plate 9 and the positioning portion 110 of the optical sheet 11 is formed in a concave shape in each of the aforementioned first and second embodiments, the present invention is not restricted to this. Alternatively, each of the positioning portion of the light guide plate and the positioning portion of the optical sheet may be formed in a convex shape, and the side surface of the positioning member may be formed in a shape corresponding to the convex shape, for example. Furthermore, alternatively the positioning portion of the light guide plate may be formed in a concave shape, the positioning portion of the optical sheet may be formed in a convex shape, and a portion in a shape corresponding to the concave shape and a portion in a shape corresponding to the convex shape may be formed in the side surface of the positioning member. Each of the shapes of the positioning portions of the light guide plate and the optical sheet is not restricted to a particular shape so far as the shape enables positioning.

While the positioning member 8 or 208 is so formed as to position not only the light guide plate 9 but also the optical sheet 11 in each of the aforementioned first and second embodiments, the present invention is not restricted to this. In the present invention, the positioning member may alternatively be so formed as to be capable of positioning at least the light guide plate. Thus, the positioning member can be reduced in size.

While the protrusion height of upper surface 84 of the positioning member 8 is higher than the protrusion height of the upper surface 11a of the optical sheet 11 in the aforementioned first embodiment, the present invention is not restricted to this. In the present invention, the protrusion height of the upper surface 84 of the positioning member 8 may alternatively be equal to the protrusion height of the upper surface 11a of the optical sheet 11.

While the portions (the notched hole 60 or 260 and the folded section 61 or 261 of the rear frame 6 or 206, the positioning portion 70 of the reflective sheet 7 or 207, the positioning portion 85 or 283 of the positioning member 8 or 208, the positioning portion 90 of the light guide plate 9, and the positioning portion 110 of the optical sheet 11) of the liquid crystal module 3 or 203 contributing to positioning are provided at a position in the vicinity of the side surface of the liquid crystal module 3 or 203 on the C2 side in each of the aforementioned first and second embodiments, the present invention is not restricted to this. In the present invention, the portions of the liquid crystal module contributing to positioning may alternatively be provided at another position other than the vicinity of the side surface of the liquid crystal module on the C2 side. Furthermore, the portions of the liquid crystal module contributing to positioning may alternatively be provided at a plurality of positions. Thus, the rear frame, the reflective sheet, the light guide plate, and the optical sheet can be more reliably positioned.

While the "recess portion" in the present invention is formed of the groove portion 80 or 280 uniformly extending in the direction B from the side surface of the positioning member 8 or 208 on the B1 side to the side surface of the positioning member 8 or 208 on the B2 side in each of the aforementioned first and second embodiments, the present invention is not restricted to this. In the present invention, the recess portion may simply be capable of being fitted onto the folded section. For example, the recess portion may be so formed as to uniformly extend in the direction B from the vicinity of the side surface on the B1 side to the vicinity of the side surface on the B2 side, not extend from the side surface on the B1 side to the side surface on the B1 side.

While the positioning member 8 or 208 is made of the white resin member capable of reflecting light in each of the aforementioned first and second embodiments, the present invention is not restricted to this. In the present invention, the positioning member may simply be at least a resin member.

While the light guide plate 9 is made of PC (polycarbonate) resin in each of the aforementioned first and second embodiments, the present invention is not restricted to this. For example, the light guide plate 9 may alternatively be made of another resin material such as ABS (acrylonitrile butadiene styrene) resin, acrylic resin, or PET (polyethylene terephthalate) resin.

While the "display device" in the present invention is applied to the liquid crystal television set 100 in each of the aforementioned first and second embodiments, the present invention is not restricted to this. For example, the "display device" in the present invention may alternatively be applied to a liquid crystal display monitor loaded into a car navigation system, an information display monitor (liquid crystal display monitor) loaded into a train, a bus, a ship, or an airplane, or the like.

What is claimed is:

1. A display module comprising:
a display portion;
a light-emitting portion to apply light to said display portion;
a light guide plate made of resin to guide said light from said light-emitting portion to said display portion, including a first positioning portion;
a frame made of metal in which said light guide plate is arranged inside, including a hole;
a positioning member made of resin, including a second positioning portion so formed as to be capable of positioning said first positioning portion of said light guide plate in a state where said positioning member is so arranged as to cover said hole of said frame; and
a reflective sheet arranged between said light guide plate and said frame;
wherein said second positioning portion of said positioning member is so formed as to position said first positioning portion of said light guide plate by directly contacting with said first positioning portion of said light guide plate;
said frame further includes a folded section formed when said hole is formed by partially uprightly folding said frame;
said positioning member further includes a recess portion fitted onto said folded section;
a position of said second positioning portion of said positioning member is defined in a state where said recess portion is fitted onto said folded section; and
said positioning member further includes a clearance closure portion arranged between said folded section and said reflective sheet to close a clearance between said folded section and said reflective sheet.

2. The display module according to claim 1, wherein
said first positioning portion of said light guide plate has a concave shape, and
said second positioning portion of said positioning member has a shape corresponding to said concave shape of said first positioning portion.

3. The display module according to claim 2, wherein
said first positioning portion having said concave shape extends in a first direction and has first and second inner surfaces opposed to each other and a third inner surface extending in a second direction substantially orthogonal to said first direction, and
said second positioning portion extends in said first direction and has first and second side surfaces positioning said first and second inner surfaces, respectively and a third side surface extending in said second direction, positioning said third inner surface.

4. The display module according to claim 1, further comprising a reflective sheet arranged between said light guide plate and said frame, wherein
said positioning member is arranged on a surface of said reflective sheet closer to said light guide plate at least in a periphery of said folded section.

5. The display module according to claim 1, further comprising a reflective sheet arranged between said light guide plate and said frame, including a third positioning portion so formed as to be capable of being positioned by said folded section.

6. The display module according to claim 1, wherein
said clearance closure portion of said positioning member protrudes toward said frame and is inserted into between said folded section and said reflective sheet to close said clearance between said folded section and said reflective sheet.

7. The display module according to claim 1, wherein
said hole of said frame is covered with said reflective sheet and said clearance closure portion of said positioning member.

8. The display module according to claim 1, wherein
said folded section of said frame is formed in a vicinity of a side surface of said frame.

9. The display module according to claim 8, wherein
said folded section is formed toward said side surface of said frame so that said folded section is formed on a side of said side surface of said frame relative to said hole.

10. The display module according to claim 8, wherein
said folded section is formed toward a side opposite to said side surface of said frame so that said folded section is formed on said side opposite to said side surface of said frame relative to said hole.

11. The display module according to claim 1, further comprising an optical sheet including a fourth positioning portion so formed as to be capable of being positioned by said second positioning portion of said positioning member, arranged on a surface of said light guide plate closer to said display portion.

12. The display module according to claim 11, wherein
a protrusion height of an end portion of said second positioning portion of said positioning member closer to said display portion is at least a protrusion height of an end portion of said fourth positioning portion of said optical sheet closer to said display portion.

13. The display module according to claim 1, wherein
said positioning member is made of a white resin member capable of reflecting light.

14. A display device comprising:
a display portion;
a light-emitting portion to apply light to said display portion;
a light guide plate made of resin to guide said light from said light-emitting portion to said display portion, including a first positioning portion;
a frame made of metal in which said light guide plate is arranged inside, including a hole;
a positioning member made of resin, including a second positioning portion so formed as to be capable of positioning said first positioning portion of said light guide plate in a state where said positioning member is so arranged as to cover said hole of said frame; and
a reflective sheet arranged between said light guide plate and said frame;
wherein said second positioning portion of said positioning member is so formed as to position said first positioning portion of said light guide plate by directly contacting with said first positioning portion of said light guide plate;
said frame further includes a folded section formed when said hole is formed by partially uprightly folding said frame;
said positioning member further includes a recess portion fitted onto said folded section;
a position of said second positioning portion of said positioning member is defined in a state where said recess portion is fitted onto said folded section; and
said positioning member further includes a clearance closure portion arranged between said folded section and said reflective sheet to close a clearance between said folded section and said reflective sheet.

15. The display device according to claim 14, wherein
said first positioning portion of said light guide plate has a concave shape, and
said second positioning portion of said positioning member has a shape corresponding to said concave shape of said first positioning portion.

16. The display device according to claim 14, wherein
said frame further includes a folded section formed when said hole is formed by partially uprightly folding said frame,
said positioning member further includes a recess portion fitted onto said folded section, and
a position of said second positioning portion of said positioning member is defined in a state where said recess portion is fitted onto said folded section.

17. The display device according to claim 16, further comprising a reflective sheet arranged between said light guide plate and said frame, wherein
said positioning member is arranged on a surface of said reflective sheet closer to said light guide plate at least in a periphery of said folded section.

18. A liquid crystal television set comprising:
a liquid crystal display portion;
a light-emitting portion to apply light to said liquid crystal display portion;
a light guide plate made of resin to guide said light from said light-emitting portion to said liquid crystal display portion, including a first positioning portion;
a frame made of metal in which said light guide plate is arranged inside, including a hole;
a positioning member made of resin, including a second positioning portion so formed as to be capable of positioning said first positioning portion of said light guide plate in a state where said positioning member is so arranged as to cover said hole of said frame; and
a reflective sheet arranged between said light guide plate and said frame;
wherein said second positioning portion of said positioning member is so formed as to position said first positioning portion of said light guide plate by directly contacting with said first positioning portion of said light guide plate;
said frame further includes a folded section formed when said hole is formed by partially uprightly folding said frame;
said positioning member further includes a recess portion fitted onto said folded section;
a position of said second positioning portion of said positioning member is defined in a state where said recess portion is fitted onto said folded section; and
said positioning member further includes a clearance closure portion arranged between said folded section and said reflective sheet to close a clearance between said folded section and said reflective sheet.

* * * * *